Patented Aug. 23, 1938

2,128,101

UNITED STATES PATENT OFFICE 2,128,101

MANUFACTURE AND APPLICATION OF CARBAZOLE DERIVATIVES

Wilfred Archibald Sexton, Blackley, Manchester, England, assignor to Imperial Chemical Industries Limited, a corporation of Great Britain No Drawing. Application May 7, 1935, Serial No. 20,295. In Great Britain May 7, 1934

4 Claims. (Cl. 260—164)

In British Patent No. 343,164 azo dyestuffs insoluble in water are made by coupling a diazo compound of an aromatic amine, diamine or aminoazo compound or of a heterocyclic amine or of a derivative thereof containing no group inducing solubility in water, in substance or on the fibre, with an arylamide of carbazole-2-hydroxy-3-carboxylic acid. Dyes of the most varied shades are stated to be obtained, which when produced on the fibre, possess satisfactory fastness properties.

Some of the arylamides suffer from the defect that dyeings obtained therefrom show a considerable change of shade during the soaping treatment.

I now find that the 2-hydroxy-carbazole-3-carboxylic dianisidide, when coupled on the fibre with a diazotized arylamine of the benzene series free from solubilizing groups, gives dyeings which are remarkably free from the said defect.

The dianisidine referred to herein is otherwise called 4:4'-diamino-3:3'-dimethoxy-diphenyl and the formula of 2-hydroxy-carbazole-3-carboxylic-dianisidide is

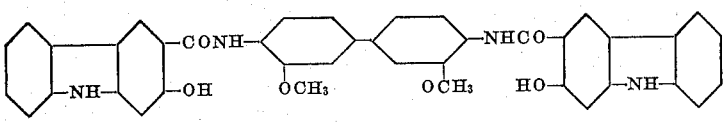

The invention is illustrated by the following example in which the parts are by weight.

Example 2 parts of 2-hydroxycarbazole-3-carboxylic dianisidide (which in the crude form may be made from the acid and dianisidine by known methods, and which has M. P. 260-267° C.) are pasted with 4 parts of methylated spirit and treated with 1 part of aqueous caustic soda 62° Tw. followed by 2 parts of cold water. After allowing to stand for a short time, the brown solution is poured into 900 parts of water containing 9 parts of Turkey red oil and 10 parts of aqueous caustic soda 62° Tw. It is finally made up to 1000 parts with cold water.

Cotton (1 part to 20 parts of liquor) is steeped in the solution at 25-30° C. for half an hour, squeezed to remove surplus liquor and the color developed by immersion in a diazo bath (as below) in the usual ice color process. The dyeing is rinsed and then boiled for half hour in a bath containing 2 parts of sodium carbonate and 3 parts of soap per 1000 parts of water. Little or no change of shade occurs. The dyeing is fast to light.

The following table gives a list of the shades obtained with different diazo compounds in the developing bath.

| Diazotized amine | Shade |
|---|---|
| m-Chloroaniline | Brown. |
| 2,5-dichloroaniline | Do. |
| 4-chloro-2-toluidine | Do. |
| 4-nitro-2-toluidine | Yellowish-brown. |
| 4-nitro-2-anisidine | Reddish-brown. |
| o-Nitroaniline | Do. |
| 4-chloro-2-anisidine | Brown. |
| 5-chloro-2-toluidine | Do. |
| 3-nitro-4-toluidine | Red-brown. |
| 4-chloro-2-nitroaniline | Do. |
| 5-nitro-2-toluidine | Do. |
| 5-nitro-2-anisidine | Brown. |

All these dyeings are both fast to soaping and fast to light.

I claim:
1. A dyestuff being the product formed by coupling 2-hydroxy-carbazole-3-carboxylic-dianisidide to a diazotized arylamine having a single benzene nucleus free from water-solubilizing groups.

2. A dyestuff being the product formed by reacting two parts of 2-hydroxycarbazole-3-carboxylic-dianisidide with diazotized meta-chloroaniline.

3. A dyestuff being the product formed by reacting two parts of 2-hydroxycarbazole-3-carboxylic-dianisidide with diazotized 2:5-dichloroaniline.

4. A dyestuff being the product formed by reacting two parts of 2-hydroxycarbazole-3-carboxylic-dianisidide with diazotized 4-nitro-2-toluidine.

WILFRED ARCHIBALD SEXTON.